(12) United States Patent
Kung

(10) Patent No.: US 6,700,689 B2
(45) Date of Patent: Mar. 2, 2004

(54) ADJUSTING DEVICE FOR ADJUSTING A PROJECTING DIRECTION OF A VIEW

(76) Inventor: Su-Min Kung, 8F., No. 276-2, Sec. 1, Ta-Tung Rd., Hsi Chin City, Taipei Hsien (TW)

( * ) Notice: Subject to any disclaimer, the term of this patent is extended or adjusted under 35 U.S.C. 154(b) by 18 days.

(21) Appl. No.: 10/114,096

(22) Filed: Apr. 1, 2002

(65) Prior Publication Data
US 2003/0184858 A1 Oct. 2, 2003

(51) Int. Cl.⁷ .............................................. G02B 26/08
(52) U.S. Cl. ...................... 359/223; 359/225; 359/402; 359/433
(58) Field of Search ................................. 359/196, 223, 359/225, 368, 385, 388, 399, 402, 403, 405, 406, 433, 503, 504, 506, 871, 875, 879

(56) References Cited

U.S. PATENT DOCUMENTS

| | | | | | |
|---|---|---|---|---|---|
| 3,603,671 A | * | 9/1971 | Brown | ........................ | 359/849 |
| 3,749,494 A | * | 7/1973 | Hodges | ........................ | 356/16 |
| 3,800,160 A | * | 3/1974 | Ishizawa et al. | ............... | 377/6 |
| 3,971,620 A | * | 7/1976 | Everett | ........................ | 359/430 |
| 4,688,905 A | * | 8/1987 | Okamura | ........................ | 359/726 |
| 6,193,386 B1 | * | 2/2001 | Reynolds | ........................ | 362/109 |
| 6,311,424 B1 | * | 11/2001 | Burke | ........................ | 42/118 |
| 6,542,297 B1 | * | 4/2003 | Lee et al. | ........................ | 359/466 |

* cited by examiner

*Primary Examiner*—Drew Dunn
*Assistant Examiner*—Joshua L Pritchett
(74) *Attorney, Agent, or Firm*—Pro-Techtor InterNational Services

(57) ABSTRACT

An adjusting device for adjusting a projecting direction of a view comprises the following components. A reflector is pivotally installed in a body case. The body case is formed with an incident hole, first viewing hole and a second viewing hole. A reflector is located within the body case and is pivotally installed thereto. An adjusting button is located on the upper cover. A rotary flange is installed on the adjusting button. Thereby, the user rotates the adjusting button so that a rotary arm is adhered on the adjusting button. When a user desires to see an outer view; by a driving the rotary arm, the reflector is driven to rotate to a predetermined angle. On the contrary, when the user desires to see outer view from the first viewing hole; the user only needs to restore the adjusting button to the original position.

10 Claims, 7 Drawing Sheets

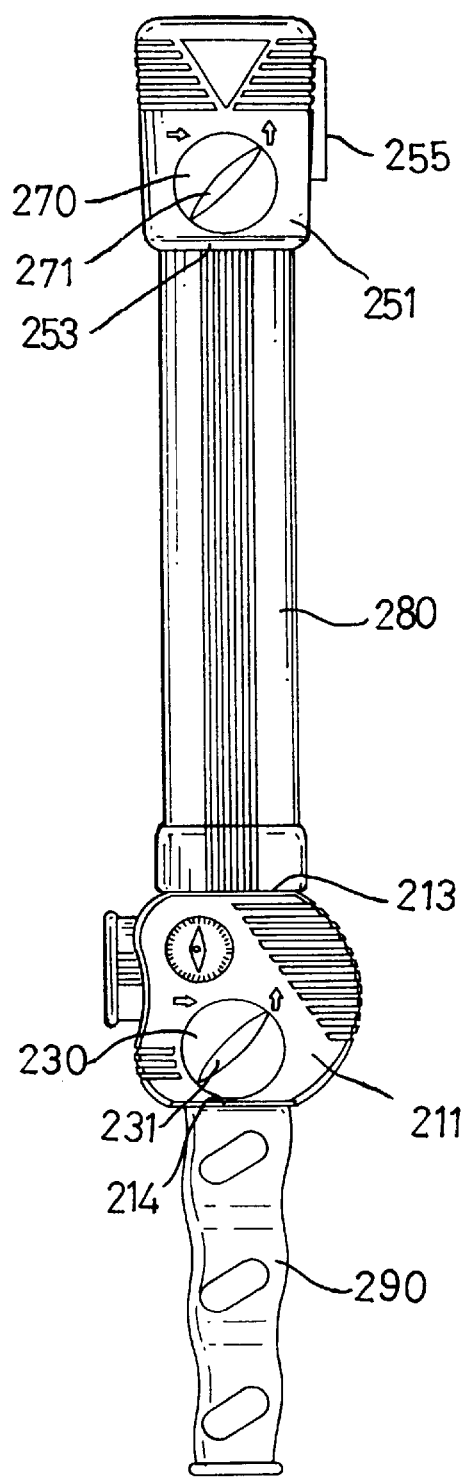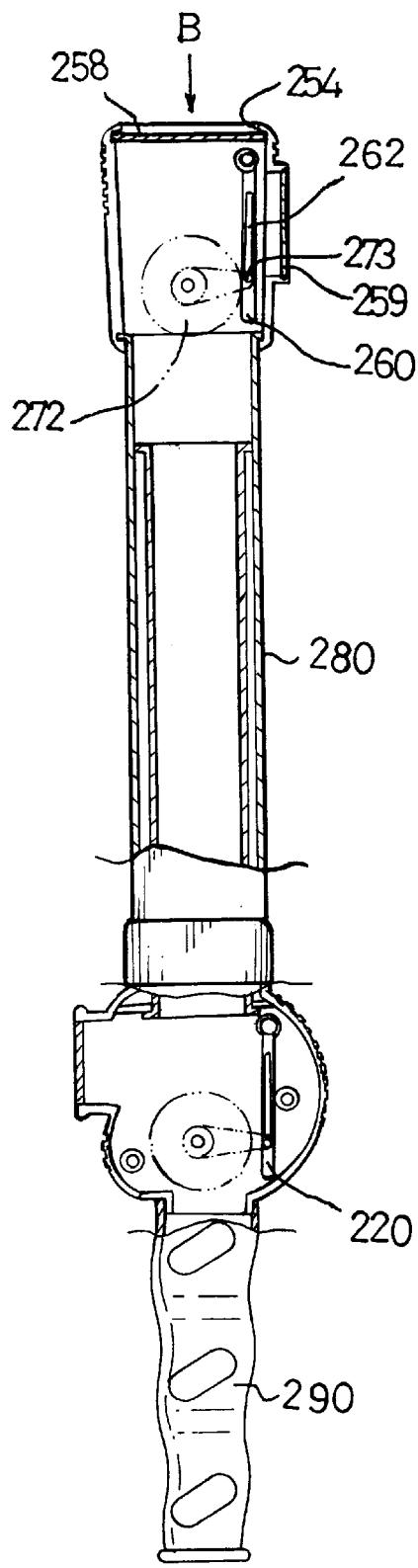
Fig. 4
Fig. 5

ADJUSTING DEVICE FOR ADJUSTING A PROJECTING DIRECTION OF A VIEW

FIELD OF THE INVENTION

The present invention relates to adjusting devices for optical instruments, and particularly to an adjusting device for adjusting a projecting direction of a view.

BACKGROUND OF THE INVENTION

Each of general optical instruments, such as telescopes, periscopes, microscopes, etc., has unique function. For example, telescopes have no function of periscope. Therefore, the instruments are only used in limited field. If a user desires to use two functions of those kinds of instruments, then he (or she) must buy two instruments. However, this is not economical and is inconvenient.

SUMMARY OF THE INVENTION

Accordingly, the primary object of the present invention is to provide an adjusting device for adjusting a projecting direction of a view, wherein the user may see the outer views from different viewing directions with different combinations of eyepiece sets and objective lens sets. Thereby, the present invention has different functions.

Another object of the present invention is to provide an adjusting device for adjusting a projecting direction of a view, wherein the present invention may receive outer views from different directions.

A further object of the present invention is to provide an adjusting device for adjusting a projecting direction of a view, wherein the projecting direction of a view is adjustable by a simply structured reflector and an adjusting button.

To achieve the object, the present invention provides an adjusting device for adjusting a projecting direction of a view, comprises the following components:

A body case is formed by an upper cover and a lower cover. A reflector is pivotally installed in the body case. The body case is formed with an incident hole, first viewing hole and a second viewing hole. The incident hole serves for receiving an outer view; a user can see the received view from the first viewing hole and the second viewing hole. A viewing direction of the first viewing hole is identical to the incident direction of the outer view. A viewing direction of the second viewing hole is perpendicular to the incident direction of the outer view;

A reflector is located within the body case and is pivotally installed thereto. One lateral side of the reflector having a surface which has a guide groove along the edge thereof; and An adjusting button is located on the upper cover. A rotary flange is installed on the adjusting button. Thereby, the user rotates the adjusting button; and then a rotary arm is adhered on the adjusting button. One end of the rotary arm is fixed to a center of the adjusting button, and another end thereof being installed with a guide block. The guide block is pivotally installed to the guide groove and is movable in the guide groove.

When a user desires to see an outer view; by applying a force to the rotary flange to drive the rotary arm; the guide block will move in the guide groove and then drive the reflector to rotate to a predetermined angle. On the contrary, when the user desires to see an outer view from the first viewing hole; the user only needs to restore the adjusting button to the original position so that the reflector will not block the incident direction of the light from the view.

Moreover, the present invention can be applied to various optical instruments. For example, two adjusting devices can be combined together, or an adjusting button is installed to a conventional microscope. The microscope can be inspected by a general way or from another orientation. Furthermore, the present invention can be installed to a conventional telescope so that the device has two functions of astronomical telescope and periscope.

The various objects and advantages of the present invention will be more readily understood from the following detailed description when read in conjunction with the appended drawing.

BRIEF DESCRIPTION OF THE DRAWINGS

FIG. 4 is a plane view of the first embodiment of the present invention.

FIG. 5 shows one application of the first embodiment of the present invention, wherein the present invention is used as a telescope.

DETAILED DESCRIPTION OF THE PREFERRED EMBODIMENTS

Figure 1:
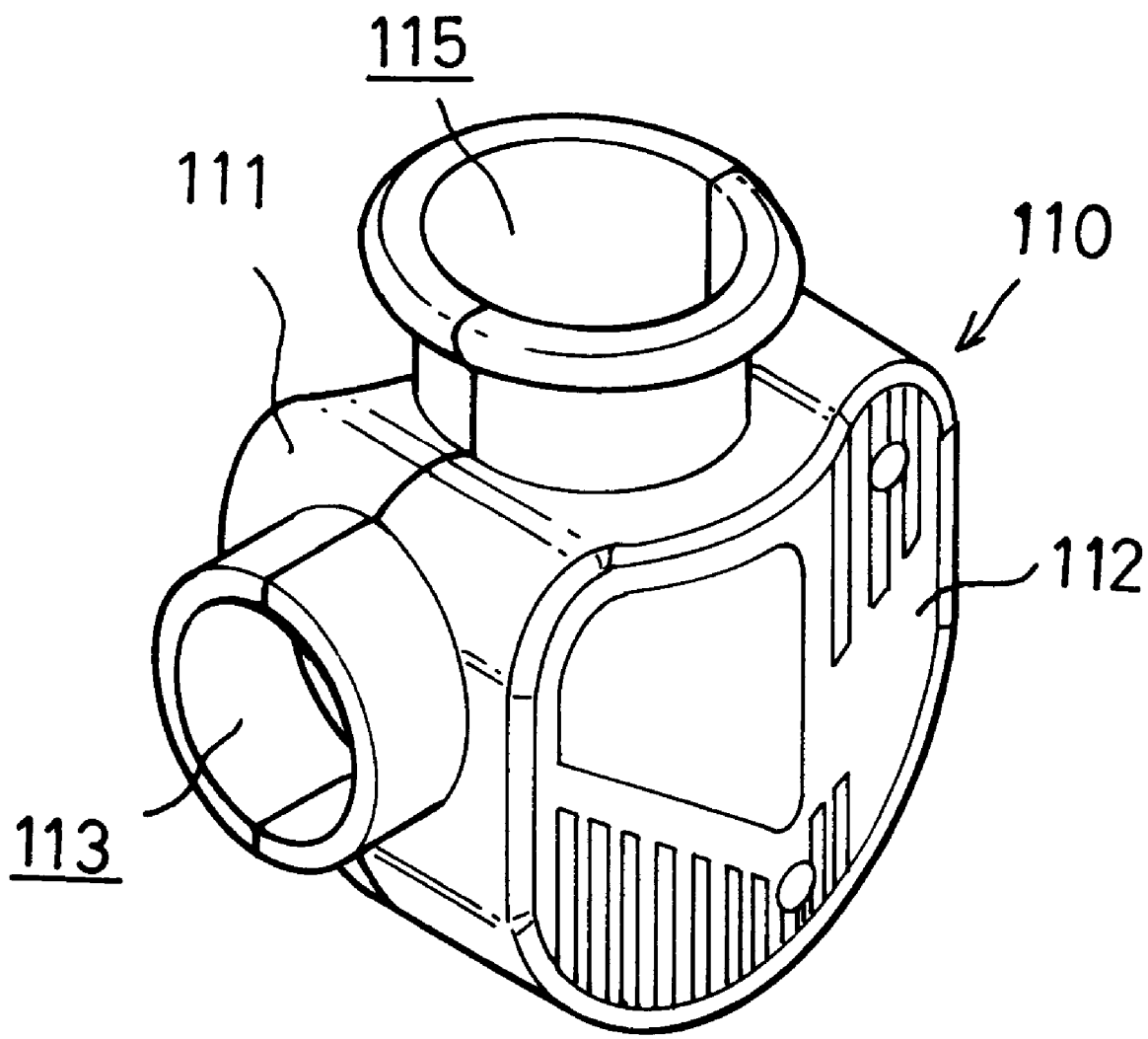
FIG. 1 is a perspective view of the present invention.

To be more understand the present invention, the embodiments of the present invention will be described further with the appended drawings. At first, Referring to FIGS. 1 and 2, the perspective view and exploded view of the present invention will be described in the following.

It is illustrated that the present invention includes a body case 110 formed by an upper cover 111 and a lower cover 112. A reflector 120 is pivotally installed in the body case 110. The body case 110 is formed with an incident hole 113, a first viewing hole 114 and a second viewing hole 115. The incident hole 113 serves for receiving an outer view. The user may see the received view from the first viewing hole 114 and the second viewing hole 115. The viewing direction of the first viewing hole 114 is identical to the incident direction of the outer view. The viewing direction of the second viewing hole 115 is perpendicular to the incident direction of the outer view.

The reflector 120 is located within the body case 110 and is pivotally installed thereto. The pivotal way is that an upper end of the reflector 120 is installed with a pivotal shaft 121. The pivot hole 116 and pivot hole 117 are installed at the body case 110. One lateral side of the reflector 120 has a surface which has a guide groove 122 along the edge thereof.

An adjusting button 130 is located on the upper cover 111. A rotary flange 131 is installed on the adjusting button 130. Thereby, the user rotates the adjusting button 130. A rotary arm 132 is adhered on the adjusting button 130. One end of the rotary arm 132 is fixed to a center of the adjusting button 130, and another end thereof is installed with a guide block 133. The guide block 133 is pivotally installed to the guide groove 122 and is movable in the guide groove 122.

A compass 140 is located on the upper cover 111.

When a user desires to see the outer view. By applying a force to the rotary flange 131 to drive the rotary arm 132. The guide block 133 will move in the guide groove 122 and then drive the reflector 120 to rotate to a predetermined angle. On the contrary, when the user desires to see an outer view from the first viewing hole 114. The user only needs to restore the adjusting button 130 to the original position so that the reflector 120 will not block the incident direction of the light of the view.

Referring to FIGS. 3 to 6, the first embodiment of the present invention is illustrated. They show a device having both functions of telescope and periscope (in the following, for the shake of convenience, the adjusting device with a body case 210 is called as a first adjusting device, and the adjusting device with a body case 250 is called as a second adjusting device).

Figure 2:
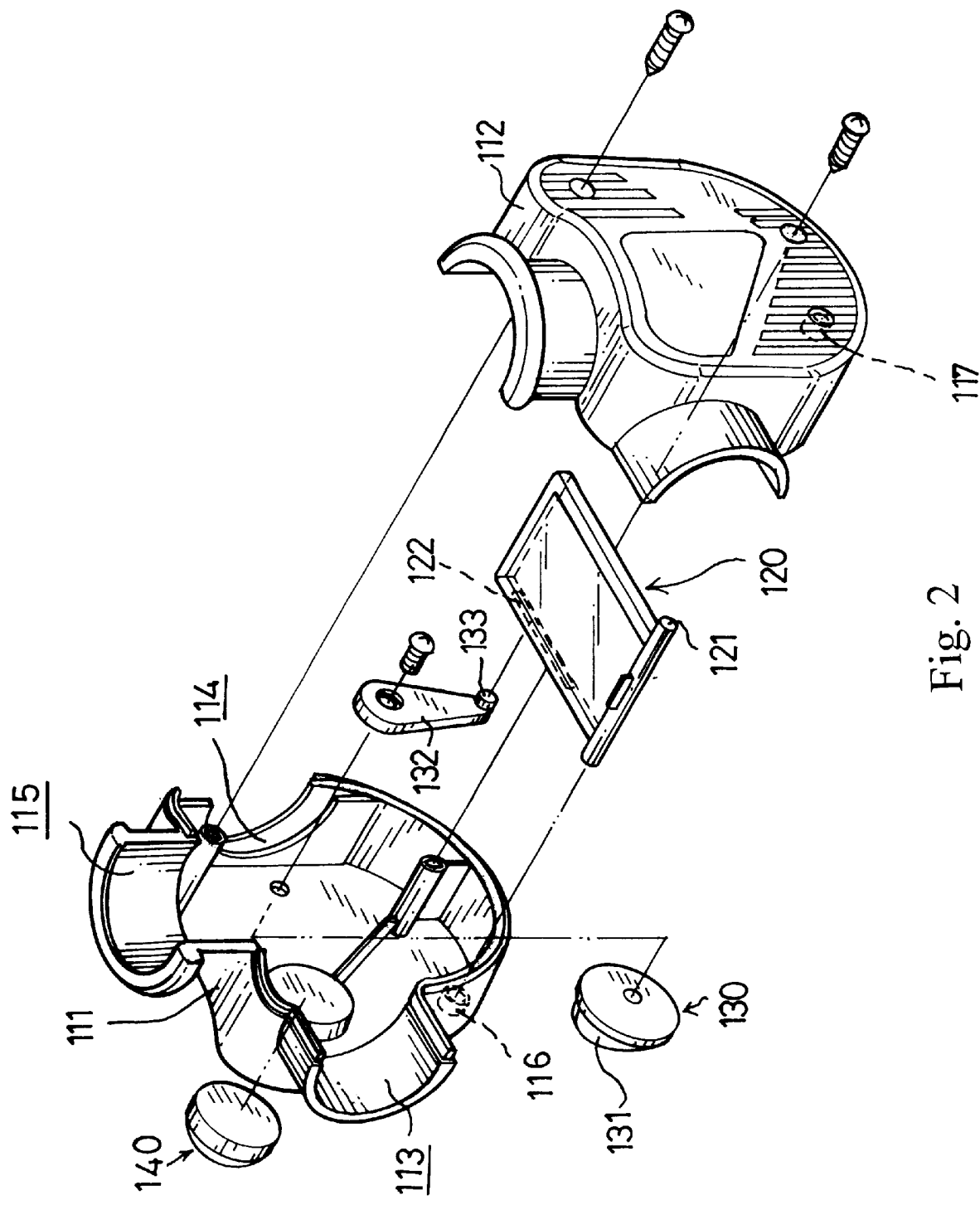
FIG. 2 is an exploded view of the present invention.
Figure 3:
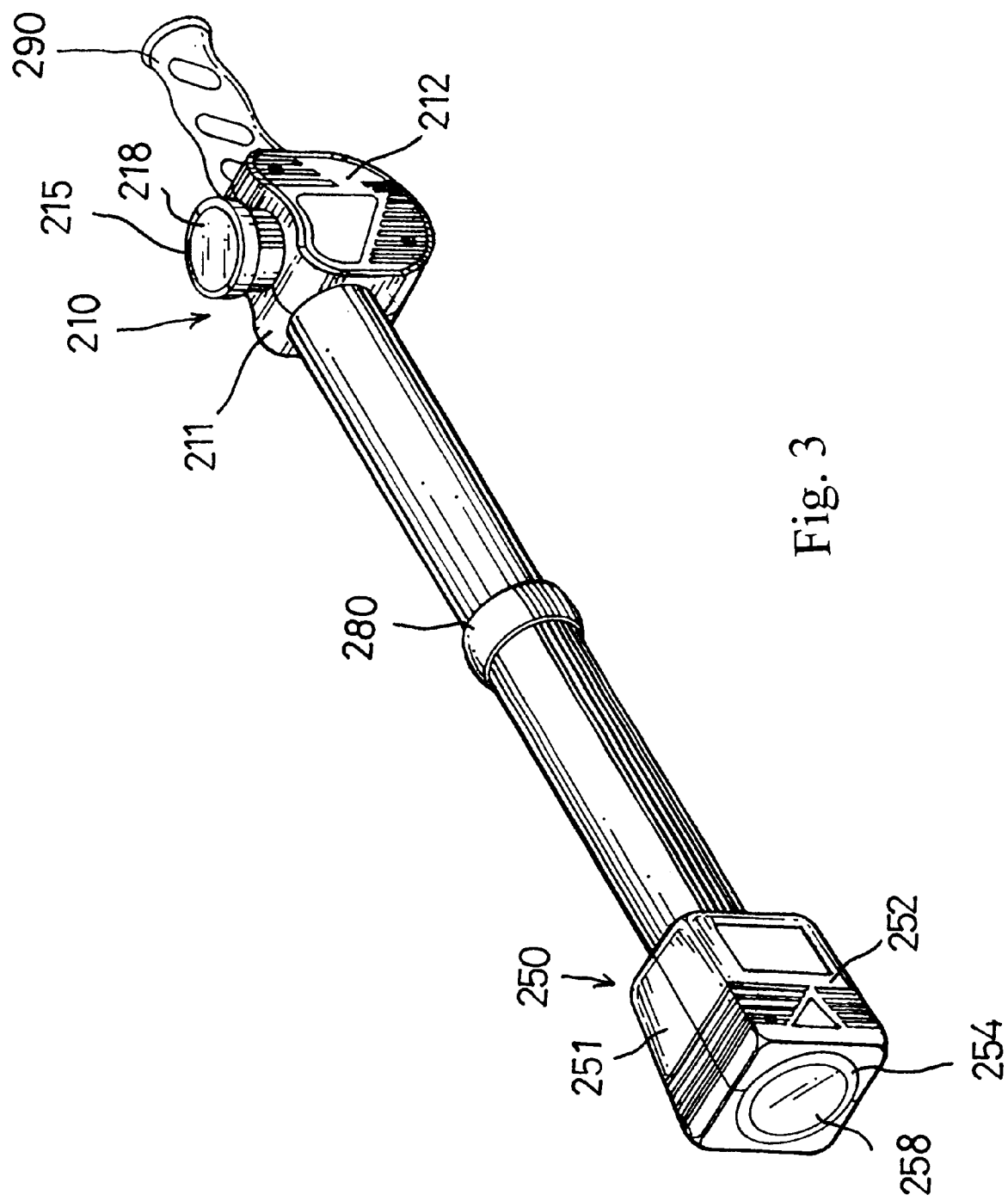
FIG. 3 is a perspective view of the first embodiment of the present invention.

The first adjusting device is identical to the adjusting device illustrated in FIGS. 1 and 2, only a lens 218 is installed on the second objective hole 215.

A handle 290 is a hollow case with an objective lens set therein. One end of the handle 290 is connected to the first objective hole 114 user may see an object from another end thereof.

A telescopic rod 280 has one end being connected to an incident hole 213 and another end thereof is connected to the projecting hole 253 of the second adjusting device for adjusting the respective position of the two adjusting devices.

The second adjusting device includes the following components.

A body case 250 is formed by an upper cover 251 and a lower cover 252. A reflector 220 is pivotally installed in the body case 250. The body case 250 is formed with a projecting hole 253, a first objective hole 254 and a second objective hole 255. The viewing direction of the first objective hole 254 is identical to the projecting direction of the view incident to projecting hole 253. An objective lens 258 is placed in the hole. The receiving direction of the second objective hole 255 is perpendicular to the projecting direction of the projecting hole 253. A lens 259 is placed in the hole.

A reflector 260 is placed in and pivotally connected to the body case 250. The edge of one surface of the reflector 260 has a guide groove 262.

An adjusting button 270 is located on the upper cover 251. A rotary flange 271 is installed on the adjusting button 270. Thereby, the user rotates the adjusting button 270. A rotary arm 272 is adhered on the adjusting button 270. One end of the rotary arm 272 is fixed to a center of the adjusting button 270, and another end thereof is installed with a guide block 273. The guide block 273 is pivotally installed to the guide groove 262 and is movable in the guide groove 262.

Figure 6:
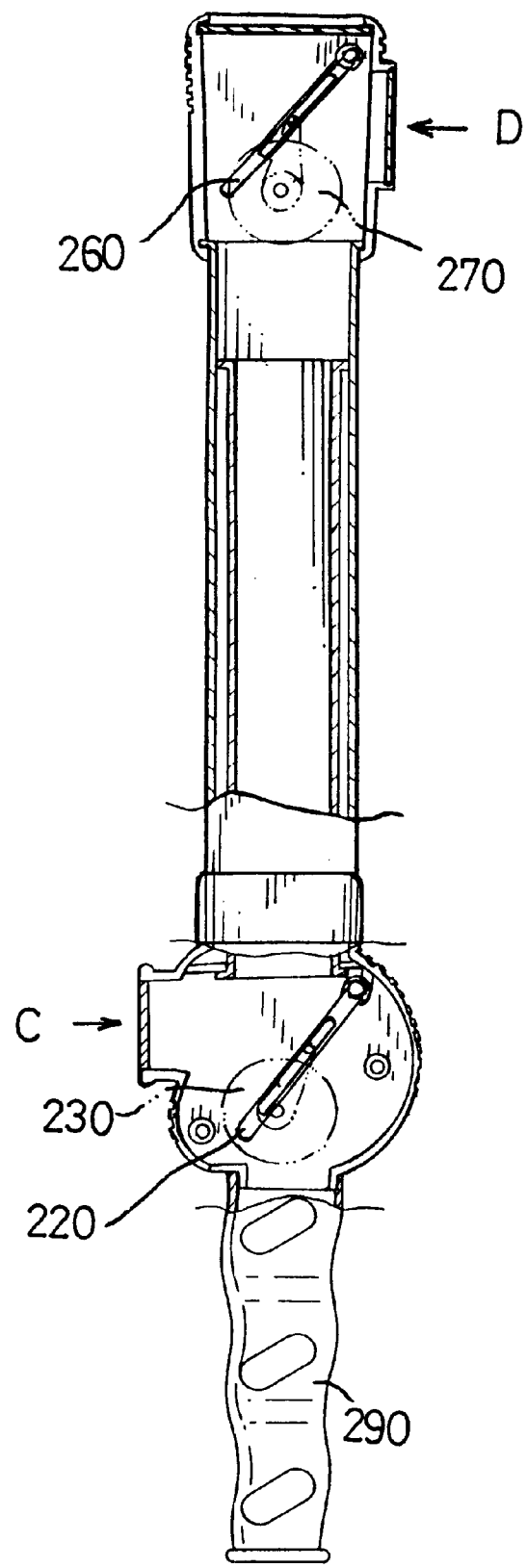
FIG. 6 shows another application of the first embodiment of the present invention, wherein the present invention is used as a periscope.

With reference to FIG. 5, an embodiment of a telescope is illustrated. The user sees the view received from the place indicated by arrow B from arrow A. The focus can be adjusted from telescopic rod 280. Referring to FIG. 6, an embodiment of a periscope is illustrated. A user can rotate the adjusting button 230 counterclockwise so that the reflector 220 to a position illustrated in the figure, and then rotate the adjusting button 270 counterclockwise so that the reflector 260 move to a position illustrated in the figure. The user can see the outer view received in a direction illustrated by arrow D from the direction illustrated by arrow C.

Figure 7:
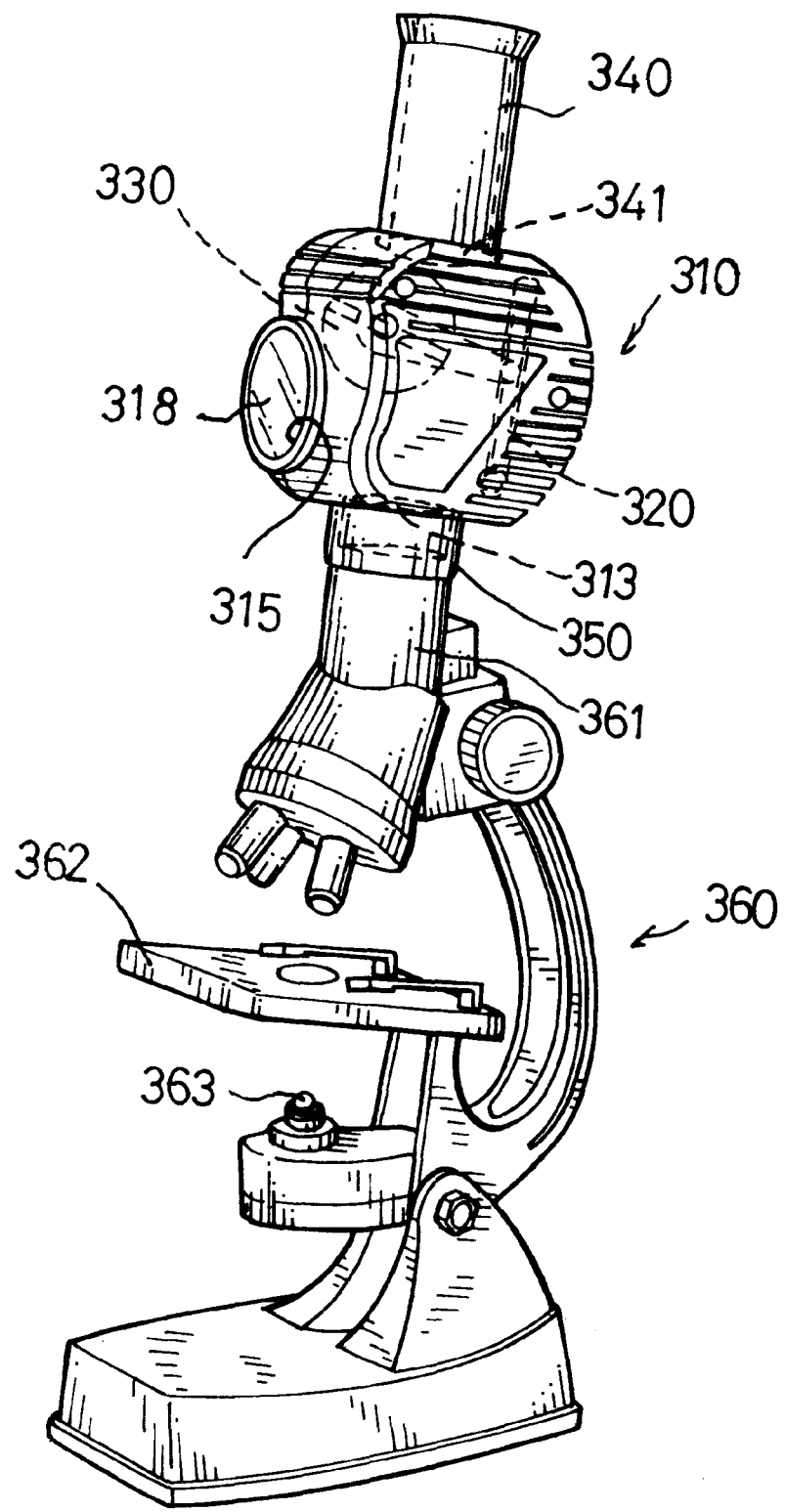
FIG. 7 shows a perspective view of the second embodiment of the present invention.

Referring to FIG. 7, the perspective view of a further embodiment of the present invention is shown. In this the present invention, the present invention is applied to a conventional microscope. The microscope has the following components.

An adjusting device has a body case 310, a reflector 320 and an adjusting button 330 which is identical to the adjusting device illustrated in FIGS. 1 and 2. A frosted glass 318 is installed on the second viewing hole 315.

An eyepiece cylinder 340 is a hollow case with an eyepiece set. One end of the eyepiece cylinder is connected to the first viewing hole 314, and another end thereof serves for being viewed by the users.

An objective cylinder 350 is a hollow case. One end of the objective cylinder is connected to an incident hole 313 and another end thereof is connected to a viewing hole 361 of a microscope. A lower side of the object table 362 of the microscope is installed with a light source 363 for increasing the lightness.

The user may inspect the microscope 360 from an eyepiece cylinder 340 by the conventional operational way, or the user can rotate the adjusting button 330 to drive the reflector 320 to a predetermined angle so that the image can project to the frosted glass 318. Thereby, the image can be viewed easily.

Figure 8:
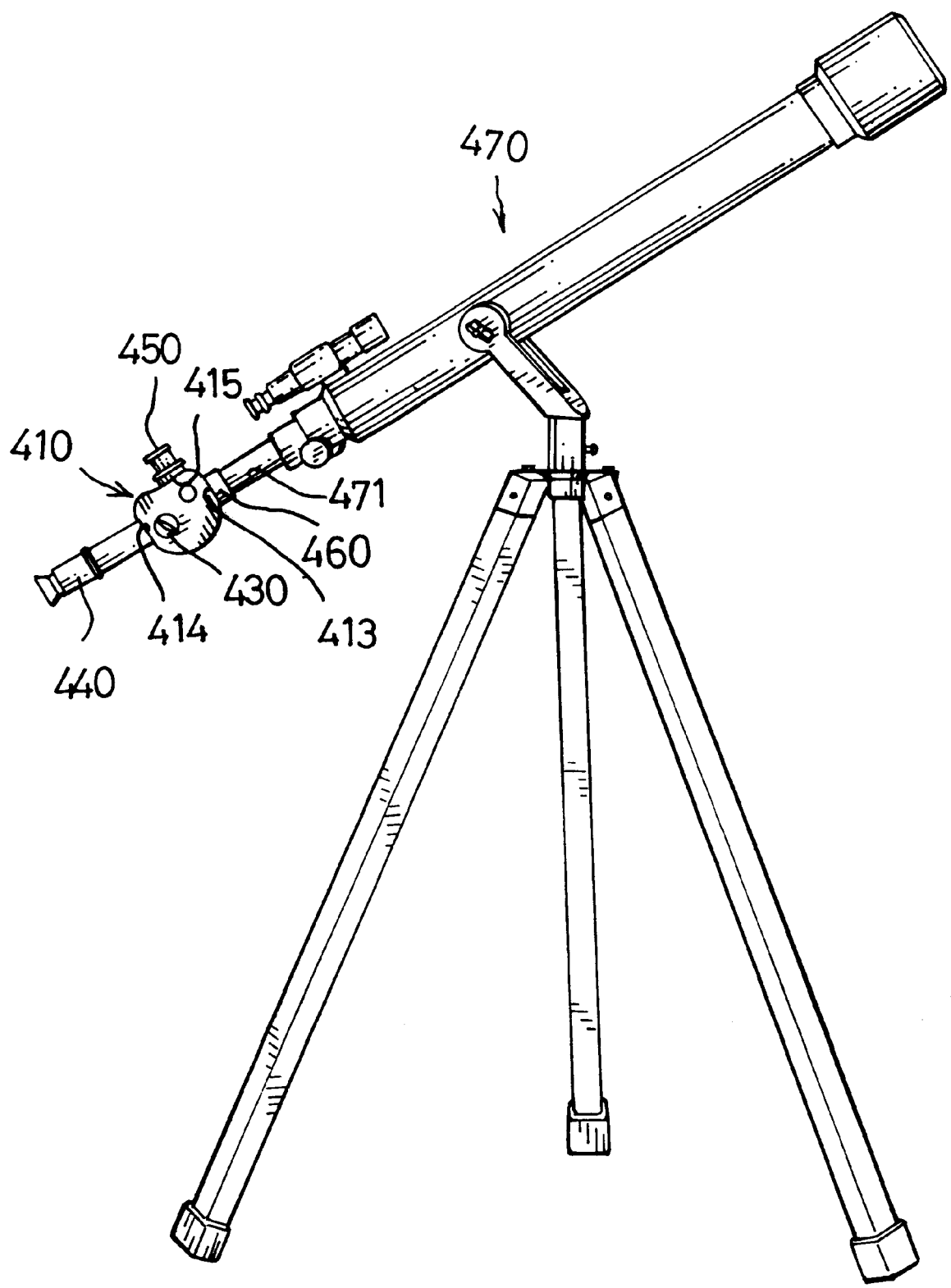
FIG. 8 shows a perspective view of the third embodiment of the present invention.

With reference to FIG. 8, another embodiment of the present invention is illustrated. In this embodiment, the present invention is applied to a conventional astronomical telescope. The astronomical telescope includes the following components.

An adjusting device has a body case 410 which is identical to the adjusting device illustrated in FIGS. 1 and 2.

A first eyepiece cylinder 440 is a hollow case with an eyepiece set therein, and one end thereof is connected to a first viewing hole 414, and another end thereof serves for being viewed by the users.

A second eyepiece cylinder 450 is a hollow case with an eyepiece set therein, and one end thereof is connected to a second viewing hole 415, and another end thereof serves for being viewed by the users.

An objective cylinder 460 is a hollow case. One end of the objective cylinder is connected to an incident hole 413 and another end thereof is connected to a viewing hole 471 of a telescope.

The user may inspect the astronomical telescope 470 from a first eyepiece cylinder 440 by the conventional operational way, or the user can rotate the adjusting button 430 to drive the reflector to a predetermined angle so as to operate the astronomical telescope from the second eyepiece cylinder 450.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An adjusting device for adjusting a projecting direction of a view, comprising:

a body case formed by an upper cover and a lower cover; a reflector being pivotally installed in the body case; the body case is formed with an incident hole, a first viewing hole and a second viewing hole; the incident hole serving for receiving an outer view a user can see the received view from the first viewing hole and the second viewing hole; a viewing direction of the first viewing hole being identical to the incident direction of the outer view; a viewing direction of the second viewing hole being perpendicular to the incident direction of the outer view; one lateral side of the reflector having a surface which has a guide groove along the edge thereof; and an adjusting button being located on the upper cover; a rotary flange being installed on the adjusting button; a rotary arm being adhered on the adjusting button; one end of the rotary arm being fixed to a center of the adjusting button, and another end thereof being installed with a guide block; the guide block being pivotally installed to the guide groove and being movable in the guide groove; whereby when a user desires to see an outer view; by applying a force to the rotary flange to drive the rotary arm; the guide block will move in the guide groove and then drive the reflector to rotate to a predetermined angle; on the contrary, when the user desires to see outer view from the first viewing hole; the user only needs to restore the adjusting button to the original position so that the reflector will not block the incident direction of the light of the view; wherein said adjusting device further comprises a lens installed on the second viewing hole; a handle being a hollow case with an objective lens set therein; one end of the handle being connected to the first objective hole and another end thereof serves for being viewed by the user; a telescopic rod having one end being connected to an incident hole and another end thereof being connected to a projecting of the second adjusting device for adjusting the respective position of the two adjusting devices; the second adjusting device includes the following components; a second body case being formed by a second upper cover and a second lower cover; a second reflector being pivotally installed in the second body case; the second body case being formed with an projecting hole, a first objective hole and a second objective hole for receiving outer view; the viewing direction of the first objective hole is identical to the projecting direction of the view projecting to the projecting hole; an objective lens being placed in the hole; a receiving direction of the second objective hole being perpendicular to a projecting direction of the projecting hole; and a lens being placed in the hole; the second reflector being placed in and pivotally connected to the second body case; an edge of one surface of the second reflector having a second guide groove; and a second adjusting button being located on the upper cover; a rotary flange being installed on the adjusting button; thereby the user rotating the adjusting button; a rotary arm being adhered on the adjusting button; one end of the rotary arm being fixed to a center of the adjusting button, and another end thereof is installed with a guide block; the guide block being pivotally installed to the guide groove and being movable in the guide groove; whereby when a user desires to see an outer view projecting to the second objective hole; by applying a force to the second rotary flange to drive the second rotary arm; the second guide block will move in the second guide groove and then drive the second reflector to rotate to a second predetermined angle; on the contrary, when the user desires to see outer view from the first viewing hole; the user only needs to restore the adjusting button to an original position so that the second reflector will not block the incident direction of the light of the view; thus a device having a function of a telescope and a periscope is achieved.

2. The adjusting device for adjusting a projecting direction of a view as claimed in claim 1, wherein an upper end of the reflector is installed with a pivotal shaft; two pivot holes are installed at the body case.

3. The adjusting device for adjusting a projecting direction of a view as claimed in claim 1, wherein a compass is located on the upper cover.

4. The adjusting device for adjusting a projecting direction of a view as claimed in claim 1, further comprising: a frosted glass being installed on the second viewing hole; an eyepiece cylinder being a hollow case with an eyepiece set; one end of the eyepiece cylinder being connected to the first viewing hole and another end thereof serves for being viewed by users; and an objective cylinder being a hollow case; one end of the objective cylinder being connected to a second incident hole and another end thereof is connected to a viewing hole of a microscope; a lower side of the object table of the microscope being installed with a light source for increasing the lightness; whereby a user inspects the microscope from a eyepiece cylinder by the conventional operational way, or the user can rotate the adjusting button to drive the reflector a predetermined angle so that an image projects to the frosted glass; thereby, the image can be viewed easily.

5. The adjusting device for adjusting a projecting direction of a view as claimed in claim 1, further comprising:

a first eyepiece cylinder being a hollow case with an eyepiece set therein, and one end thereof being connected to a first viewing hole, and another end thereof serving for being viewed by the users; a second eyepiece cylinder being a hollow case with an eyepiece set therein, and one end thereof being connected to a second viewing hole, and a user can see an object from another end thereof; and an objective cylinder being a hollow case; one end of the objective cylinder being connected to the incident hole and another end thereof being connected to a viewing hole of an astronomical telescope; whereby the user inspects the astronomical telescope from an first eyepiece cylinder by the conventional operational way, or the user rotates the adjusting button to drive the reflector to a predetermined angle so as to operate the astronomical telescope from the second eyepiece cylinder.

6. An adjusting device for adjusting a projecting direction of a view, comprising:

a body case formed by an upper cover and a lower cover; a reflector being pivotally installed in the body case; the body case is formed with an incident hole, a first viewing hole and a second viewing hole; the incident hole serving for receiving an outer view; a user can see the received view from the first viewing hole and the second viewing hole; a viewing direction of the first viewing hole being identical to the incident direction of the outer view; a viewing direction of the second viewing hole being perpendicular to the incident direction of the outer view; one lateral side of the reflector having a surface which has a guide groove along the edge thereof; and an adjusting button being located on the upper cover; a rotary flange being installed on the adjusting button; a rotary arm being adhered on the adjusting button; one end of the rotary arm being fixed to a center of the adjusting button, and another end thereof being installed with a guide block; the guide block being pivotally installed to the guide groove and being movable in the guide groove; whereby when a user desires to see an outer view; by applying a force to the rotary flange to drive the rotary arm; the guide block will move in the guide groove and then drive the reflector to rotate to a predetermined angle; on the contrary, when the user desires to see outer view from the first viewing hole; the user only needs to restore the adjusting button to the original position so that the reflector will not block the incident direction of the light of the view; wherein said adjusting device further comprises a frosted glass installed on the second viewing hole; an eyepiece cylinder being a hollow case with an eyepiece set; one end of the eyepiece cylinder being connected to the first viewing hole and another end thereof serves for being viewed by users; and an objective cylinder being a hollow case; one end of the objective cylinder being connected to a second incident hole and another end thereof is connected to a viewing hole of a microscope; a lower side of the object table of the microscope being installed with a light source for increasing the lightness; whereby a user inspects the microscope from a eyepiece cylinder by the conventional operational way, or the user can rotate the adjusting button to drive the reflector a predetermined angle so that an image projects to the frosted glass; thereby, the image can be viewed easily.

7. The adjusting device for adjusting a projecting direction of a view as claimed in claim 6, wherein an upper end of the reflector is installed with a pivotal shaft; two pivot holes are installed at the body case.

8. The adjusting device for adjusting a projecting direction of a view as claimed in claim 6, wherein a compass is located on the upper cover.

9. The adjusting device for adjusting a projecting direction of a view as claimed in claim 6, further comprising:

a lens being installed on the second viewing hole; a handle being a hollow case with an objective lens set therein; one end of the handle being connected to the first objective hole and another end thereof serves for being viewed by the user; a telescopic rod having one end being connected to an incident hole and another end thereof being connected to a projecting of the second adjusting device for adjusting the respective position of the two adjusting devices; the second adjusting device includes the following components; a second body case being formed by a second upper cover and a second lower cover; a second reflector being pivotally installed in the second body case; the second body case being formed with an projecting hole, a first objective hole and a second objective hole for receiving outer view; the viewing direction of the first objective hole is identical to the projecting direction of the view projecting to the projecting hole; an objective lens being placed in the hole; a receiving direction of the second objective hole being perpendicular to a projecting direction of the projecting hole; and a lens being placed in the hole; the second reflector being placed in and pivotally connected to the second body case; an edge of one surface of the second reflector having a second guide groove; and a second adjusting button being located on the upper cover; a rotary flange being installed on the adjusting button; thereby, the user rotating the adjusting button; a rotary arm being adhered on the adjusting button; one end of the rotary arm being fixed to a center of the adjusting button, and another end thereof is installed with a guide block; the guide block being pivotally installed to the guide groove and being movable in the guide groove; whereby when a user desires to see an outer view projecting to the second objective hole; by applying a force to the second rotary flange to drive the second rotary arm; the second guide block will move in the second guide groove and then drive the second reflector to rotate to a second predetermined angle; on the contrary, when the user desires to see outer view from the first viewing hole; the user only needs to restore the adjusting button to an original position so that the second reflector will not block the incident direction of the light of the view; thus a device having a function of telescope and periscope is achieved.

10. The adjusting device for adjusting a projecting direction of a view as claimed in claim 6, further comprising:

a first eyepiece cylinder being a hollow case with an eyepiece set therein, and one end thereof being connected to a first viewing hole, and another end thereof serving for being viewed by the users; a second eyepiece cylinder being a hollow case with an eyepiece set therein, and one end thereof being connected to a second viewing hole, and a user can see an object from another end thereof; and an objective cylinder being a hollow case; one end of the objective cylinder being connected to the incident hole and another end thereof being connected to a viewing hole of an astronomical telescope; whereby the user inspects the astronomical telescope from an first eyepiece cylinder by the conventional operational way, or the user rotates the adjusting button to drive the reflector to a predetermined angle so as to operate the astronomical telescope from the second eyepiece cylinder.

* * * * *